(12) United States Patent
Dufournier

(10) Patent No.: US 6,543,500 B1
(45) Date of Patent: Apr. 8, 2003

(54) ALARM SAFETY INSERT

(75) Inventor: Arnaud Dufournier, Clermont-Ferrand (FR)

(73) Assignee: Compagnie Générale des Etablissements Michelin & Cie, Clermont-Ferrand Cedex (FR)

( * ) Notice: Subject to any disclaimer, the term of this patent is extended or adjusted under 35 U.S.C. 154(b) by 0 days.

(21) Appl. No.: 09/621,833

(22) Filed: Jul. 24, 2000

Related U.S. Application Data

(63) Continuation of application No. PCT/EP99/00525, filed on Jan. 27, 1999.

(30) Foreign Application Priority Data

Jan. 30, 1998 (FR) .............................. 98 01386
Apr. 15, 1998 (FR) .............................. 98 04941

(51) Int. Cl.⁷ ..................... B60C 17/00; B60C 17/04; B60C 17/06
(52) U.S. Cl. ..................... 152/158; 152/516; 152/520
(58) Field of Search ................. 152/158, 516, 152/518–520, 340.1, 341.1

(56) References Cited

U.S. PATENT DOCUMENTS 3,496,983 A * 2/1970 Bartley et al. ........... 152/340.1
4,262,724 A    4/1981 Sarkissian
6,397,670 B1 * 6/2002 Dufournier et al. ........... 73/146

FOREIGN PATENT DOCUMENTS

EP   0018831   11/1980
GB   2032856   5/1980

* cited by examiner

*Primary Examiner*—Adrienne C. Johnstone
(74) *Attorney, Agent, or Firm*—Baker Botts L.L.P.

(57) ABSTRACT

A safety insert is designed to be mounted in an assembly including a tire and a rim of a vehicle, so that on bearing of the tire against the insert, the insert will generate multiple vibrating signals of the rotation frequency of the tire. In one embodiment, the vibrating signals are generated by a variation of at least one of the outer radius and radial stiffness as a function of azimuth α, which presents at least four maxima distributed in at least twice two different values M1 and M2.

18 Claims, 4 Drawing Sheets

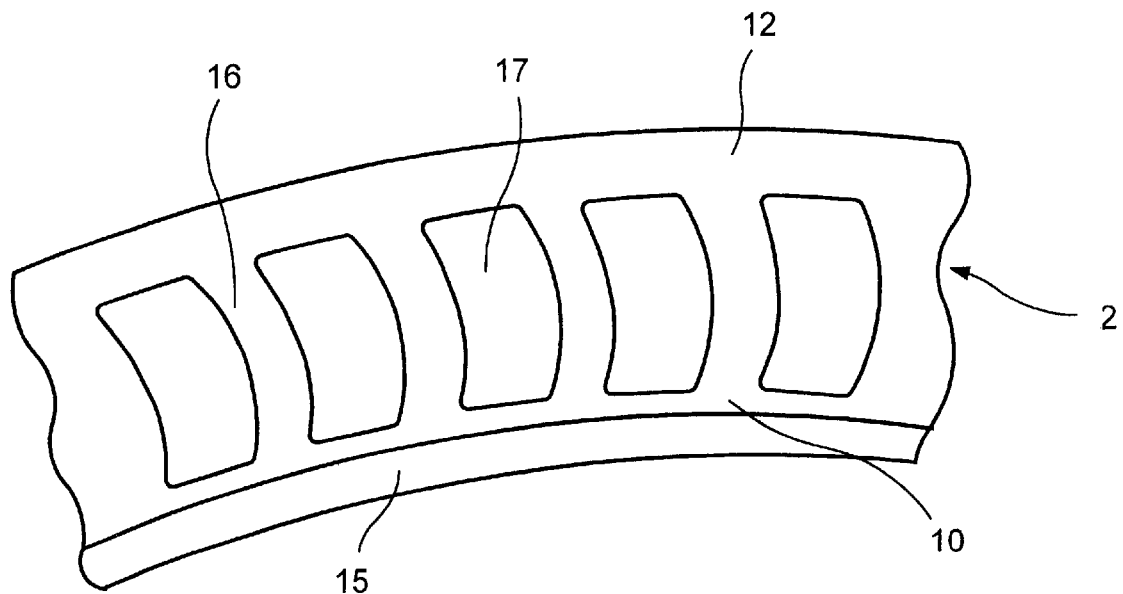
F I G. 2a
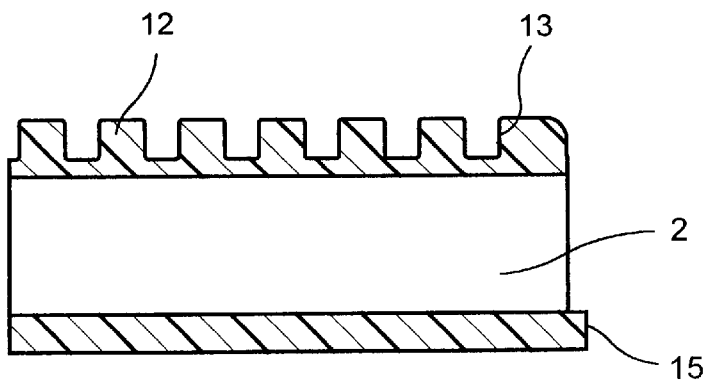
F I G. 2b

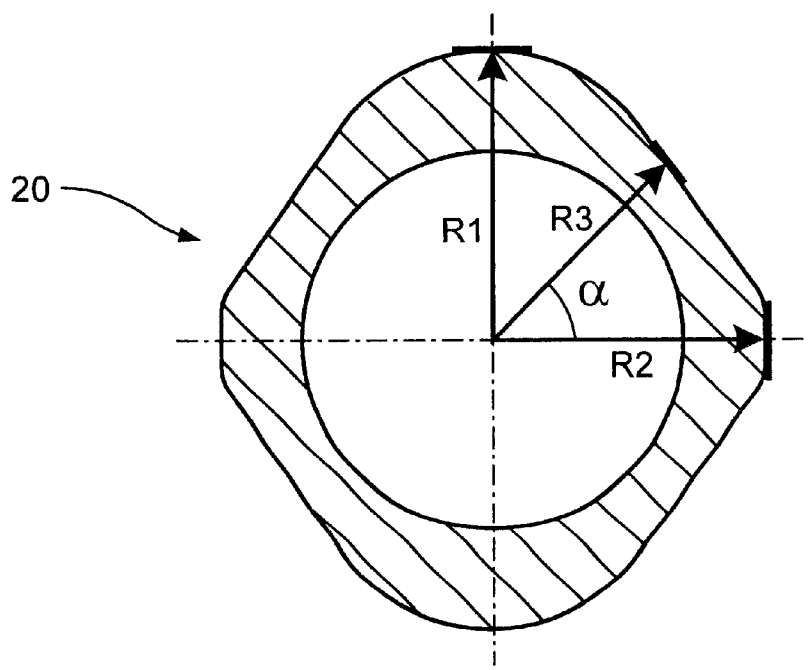
F I G. 3
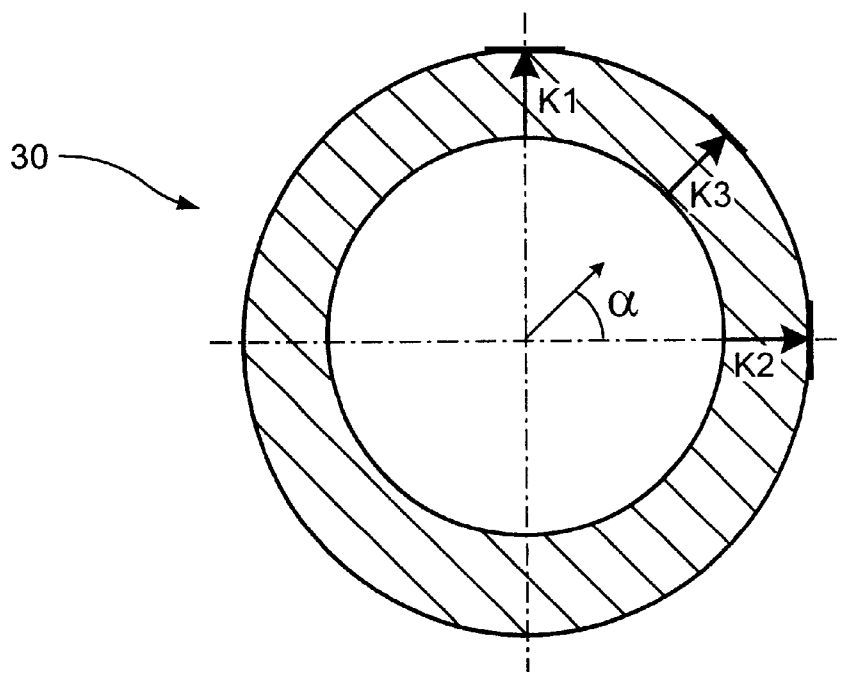
F I G. 4

ALARM SAFETY INSERT

This is a continuation of PCT/EP99/00525, filed Jan. 27, 1999.

BACKGROUND OF INVENTION

The invention concerns the use of tires equipped with safety insert and, in particular, the detection of bearing of the tire on the safety insert. It proposes an insert which warns the driver as soon as the tire bears on it after a flat or in case of substantial pressure loss.

These safety inserts are, in general, mounted on the rim inside the tire. Their function is to take up the load in case of tire failure.

The bearing of the tire on the safety insert is accompanied by a more or less marked degradation of its performance which may not be perceptible to the driver through the behavior and comfort of the vehicle. Furthermore, the operating lifetime of these inserts is limited. It is therefore essential for safety that the driver be warned as soon as a tire bears on its safety insert, so that the driver can follow the manufacturer's instructions.

Several safety inserts incorporating means for warning the driver of such bearing have previously been proposed.

U.S. Pat. No. 4,262,724 proposes a safety insert intended to be mounted in an assembly comprising a tire and a rim and radially outward from the rim. This insert has a radially outer surface which defines a radial support for the crown of the tire when the tire is deflated, as well as means for generating vibrating warning signals on a run-flat condition. These means are a variation of the run-flat radius of the insert between a minimum radius and a maximum radius or one or more bulges.

These solutions pose several problems. In order to be detected by the driver, the amplitude of the variations has to be high and that causes marked discomfort for the passengers of the vehicle, at least at certain speeds. On the other hand, it can greatly degrade the behavior of the tire and rim assembly concerned, particularly on acceleration and braking. All one can do is thus to avoid instant stopping of the vehicle in case of tire failure. On the other hand, when it is desired to use the vehicle, even at limited speed, over long distances, the warning transmitted by the insert has to be compatible with driving safety, not impairing the mechanical operation, while remaining perfectly perceptible to the driver either directly or by means of a suitable detection device.

Furthermore, patent application WO 94/03338 proposes a system for detecting the bearing of a tire on a safety insert. The system comprises a wheel accelerometer, placed on one of the wheel suspensions and measuring vertical accelerations. The accelerometers are connected to a central processing unit. The analysis is based on the detection on bearing of a resonance mode characteristic of a run-flat condition.

SUMMARY OF THE INVENTION

The invention concerns a safety insert which warns the driver, either directly or indirectly, upon bearing of the tire against the safety insert over a very wide range of speeds of the vehicle, while retaining a character tolerable to both the driver and the mechanics in the range of authorized speeds.

"Vehicle" is understood below to mean an autonomous running unit, passenger car, tractor or trailer, truck, motorcycle, etc.

A first safety insert according to the invention, intended to be mounted in an assembly comprising a tire and a rim of a vehicle and radially outward from the rim, has a radially outer bearing surface which defines a radial support for the crown of the tire when said tire is deflated and means for generating vibrating warning signals on a run-flat condition. This insert is characterized in that said means are a variation of a characteristic chosen from the group of outer radius and radial stiffness of said insert as a function of azimuth $\alpha$, which presents at least four maxima distributed in at least twice two different values M1 and M2.

In its simplest embodiment, characteristic M presents as a function of azimuth $\alpha$ two maxima M1 diametrically opposite and two maxima M2 diametrically opposite and placed at 90° from the maxima M1.

Such an insert has the advantage of producing on a run-flat condition a vibrating warning excitation distributed mainly over harmonics 2 and 4 of the turn of the wheel, while avoiding the frequency of the turn of the wheel. That facilitates detection of those signals directly by the driver, because the excitation of two harmonics, instead of only one, increases the range of speeds in which the vibrations are perceptible. Another advantage is to avoid the confusion always possible with, notably, the vibrations of the engine speed when the insert produces mainly a single excitation frequency. Furthermore, when the vehicle is equipped with a detection device, as, for example, described in application WO 94/03338, the peaks of the vibrating warning signals are very easily perceptible with very few risks of false alarms.

According to another embodiment, the characteristic M presents as a function of azimuth $\alpha$ two maxima M1 diametrically opposite and three maxima M2 distributed over the circumference and offset from the maxima M1.

Such an insert produces on a run-flat condition a vibrating warning excitation distributed mainly over harmonics 2 and 3 of the turn of the wheel, as well as by combination on harmonic 5.

According to a third embodiment, the characteristic M presents as a function of azimuth $\alpha$ two maxima M1 diametrically opposite and four maxima M2 placed at 90° from one another and offset by 45° from the maxima M1.

This insert produces on a run-flat condition a vibrating warning excitation distributed according to harmonics 2, 4 and 8. This has the advantage of an easier detection at low speed.

Preferably, on both sides of each maximum M1 or M2, there is a single value minimum M3 that increases the concentration of energy actually included in the harmonics principally excited.

The alarm means can also contain, in combination with the first variation, a variation as a function of azimuth $\alpha$ of the second characteristic of the group of the outer radius and radial stiffness of said insert.

According to another embodiment of the invention, the means are a combination of a variation of the outer radius and a variation of the radial stiffness of the insert as a function of azimuth $\alpha$, so that the insert under load presents a crushed radius as a function of azimuth $\alpha$ containing at least four maxima.

The variations of radial stiffness as a function of azimuth $\alpha$ can range between 10 and 1000% and the variations of outer radius can range between 0.1 and 7 mm.

The variation of radial stiffness of the safety insert according to the invention preferably depends on the amplitude of the radial stress to which the support is subjected. For example, beyond a given radial stress threshold, the variation of radial stiffness as a function of azimuth α increases very markedly.

Such an insert can comprise a roughly cylindrical base intended to be fitted around the rim, a roughly cylindrical crown intended to come in contact with the tire in case of pressure loss and walls appreciably connecting the base and the crown radially. It can be made of flexible elastomeric materials and have arc-shaped walls. The variations of radial stiffness are then easily obtained by varying the thickness or shape of the walls and the variations of outer radius are preferably obtained by varying the lengths of the walls.

In one particular embodiment, the variations of radial rigidity and/or outer radius of the insert are applied axially only on a part of the insert intended to be placed toward the inside of the vehicle. That has the advantage of creating, on a run-flat condition, warning torques and, therefore, signals oriented both radially and transversely, which can facilitate their detection. Another advantage is that such inserts mainly transmit vibrating warning signals only on a straight run, while on a turn, the tires having a substantial camber, it is the "inactive" uniform part of the insert which mainly bears the load. The risks of disruption of vehicle behavior are thus reduced.

Finally, the variations of a radial rigidity and/or of outer radius of the insert can present a complementary axial development as a function of azimuth α. Such a development has the advantage of creating a vibration complementing the previous ones, a component of which is oriented in the axial direction.

DESCRIPTION OF THE DRAWINGS

Several embodiments of the invention are now described by means of the attached drawing, in which:

FIG. 2a presents a partial side view of an insert of elastomeric material and FIG. 2b presents a section of the same insert;

FIG. 3 presents, in meridian section, a schematic of an insert with a variation of the outer radius;

FIG. 4 presents, in meridian section, a schematic of a second insert with a variation in radial stiffness;

DESCRIPTION OF PREFERRED EMBODIMENTS

Figure 1:
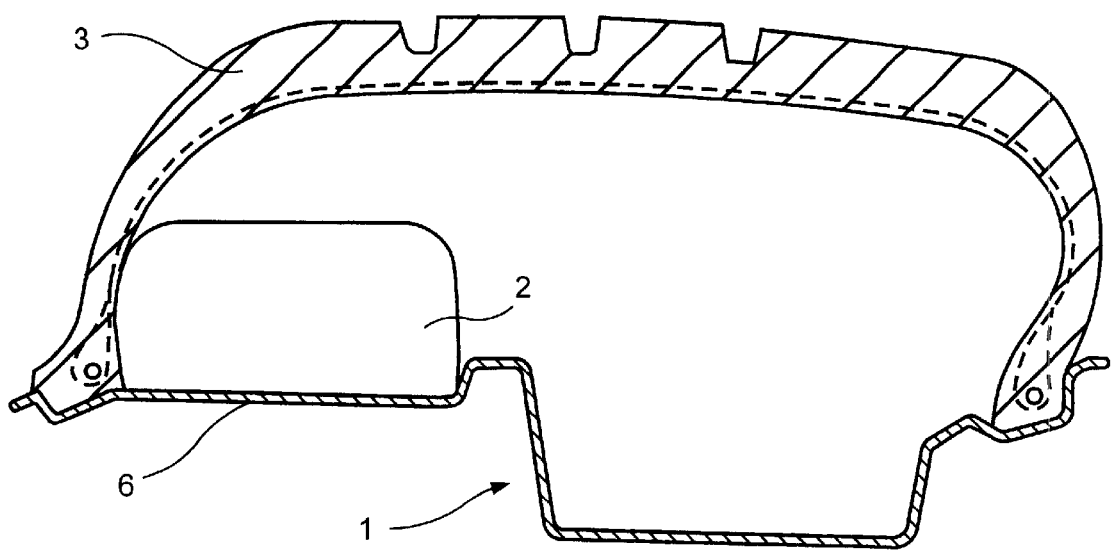
FIG. 1 presents, in meridian section, a tire and rim assembly equipped with a safety insert.

FIG. 1 shows a wheel rim 1 equipped with an annular safety insert 2 resting on the bearing 6 of the rim 1. The particular geometry of that wheel rim 1 is described in U.S. Pat. No. 5,749,982. It has two bead seats of different diameters and is particularly adapted for easy placement of said safety insert 2. This assembly makes running possible in spite of a large pressure drop in the tire 3. In case of such running, the insert of the deformed tire rubs on the outer surface of the insert, producing heating which limits the available radius of action: it is therefore important for the driver to be informed that the tire is bearing on its insert 2.

For this purpose, a safety insert is advantageously used according to the invention, which contains means for generating harmonic vibrating warning signals of the turn of the wheel (that is, of the tire rotation frequency).

The insert shown in FIG. 2 is made of flexible elastomeric material. It comprises a generally ring-shaped base 10 reinforced by a ply (not represented) longitudinally oriented roughly at 0°, an appreciably annular crown 12 with longitudinal grooves 13 on its radially outer wall. It also has shaped walls joining the crown 12 and the base 10. Between the walls 16 there are recesses 17 which, as shown in FIG. 2b, completely cross the insert 2 axially. The base can include a stud 15 placed on the outer side near the tire bead.

Such an insert 2 can very easily have its radial stiffness modified by local widening or varying the shape of the walls 16. Its outer radius can also be modified by local increase of the thickness of the base 10 or of the crown 12 and preferably by radial elongation of the walls 16, which increases the weight of the insert only very slightly. Depending on the use of the insert, in cooperation or not with a detection device, and on the type of vehicle equipped, the amplitudes of variations of outer radius and radial stiffness can very markedly vary: between 0.1 and 7 mm for the outer radius and preferably between 1 and 3 mm and by 10 to 1000% for the radial rigidity.

FIG. 3 presents a diagram of an insert 20 according to the invention, which has a variation of outer radius among three values R1, R2 and R3, such that R1>R2>R3, with a progressive variation of that radius between the maxima and the minima. The two zones of outer radii R1 are at 180° from one another and so are the two zones of radii R2; the four minima of radii R3 are each between two maxima R1 and R2. This results, on a run-flat condition, in a variation of crushed radius as a function of azimuth α with two principal harmonics, the first of frequency 2, due to the first two maxima of radius R1 and the second of frequency 4 due to the presence of the four maxima of radii R1 and R2 and of the four minima of radius R3. In that example, the R1–R3 difference is equal to 5 mm and the R2–R1 difference is equal to 3 mm.

FIG. 4 present a diagram of an insert 30 according to the invention, which has a variation of radial stiffness among three values K1, K2 and K3, such that K1>K2>K3, with a progressive variation of that radius between the maxima and the minima. As previously, the two zones of stiffness K1 are at 180° from one another and so are the two zones of stiffness K2; the four minima of stiffness K3 are each between two maxima K1 and K2. This results, on a run-flat condition, in a variation of that stiffness as a function of a with two principal harmonics, the first of frequency 2, due to the first two maxima of stiffness K1 and the second of frequency 4 due to the presence of the four maxima of stiffness K1 and K2 and of the four minima of stiffness K3.

Figure 5:
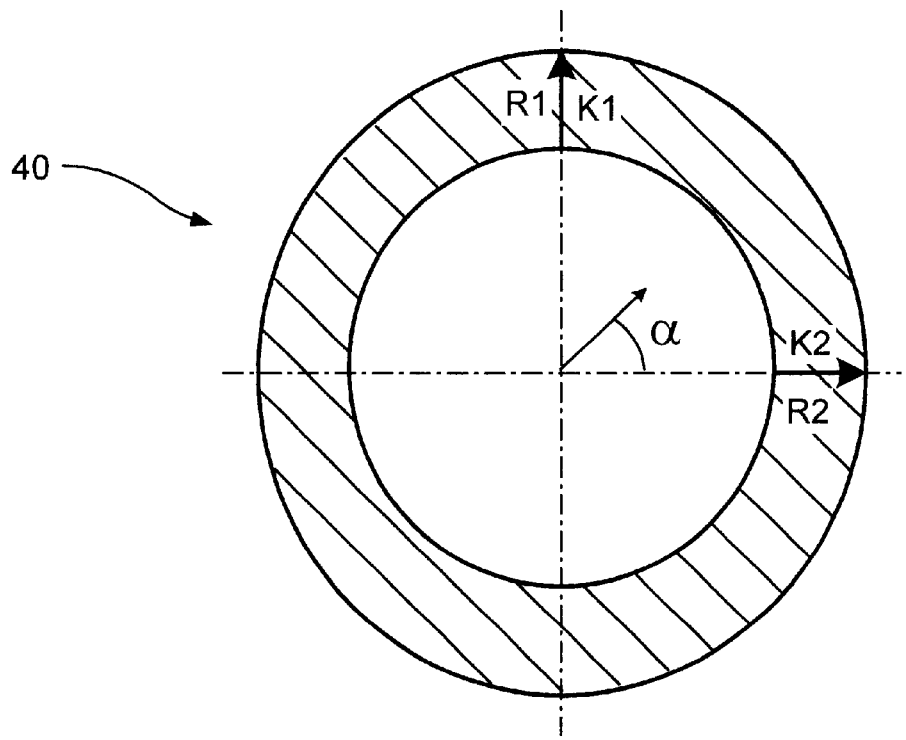
FIG. 5 presents, in meridian section, a schematic of a third insert with a combination of variations of radial stiffness and outer radius.

FIG. 5 shows a diagram of an insert 40 according to the invention, which presents a combination of a variation of outer radius and a variation of radial stiffness. Each characteristic presents two maxima (R1, K2 respectively) and two minima (R2, K1, respectively). The two maxima of radius R1 are offset from each other at an angle of 180° and are arranged at 90° from the two minima R2. Likewise, the two maxima of stiffness K2 are offset from each other at an angle of 180° and are arranged at 90° from the two minima K1. Finally, each maximum of radius R1 is offset at an angle of 90° from the two maxima of stiffness K2. The maxima of radial stiffness are sufficiently localized to produce in the insert assembly 40 a crushed radius on support containing four maxima.

Consequently, that insert also produces an harmonic excitation concentrated on harmonics 2 and 4, but has the advantage of having a variable weighing as a function of speed. It has been found that the radial variations of stiffness were more perceptible at low speed and that the variations of outer radius were more perceptible at high speed. That increases the effective range of speeds of use of the insert.

Figure 6:
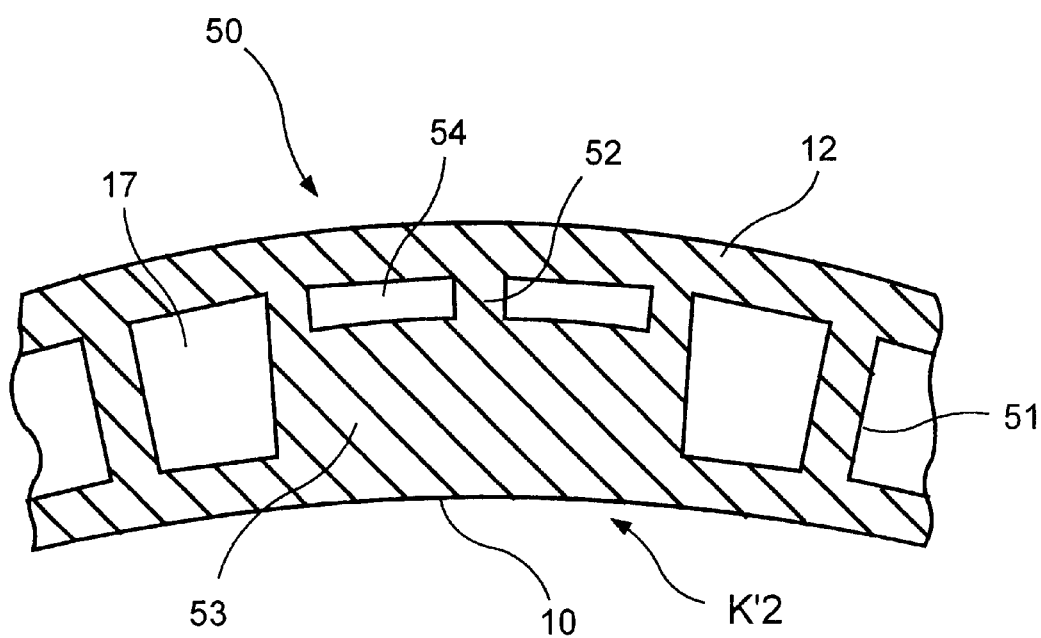
FIG. 6 presents, in partial side view, a variant of the insert of FIG. 5.

FIG. 6 shows an insert 50 in partial side view. That insert, like the previous insert 40, presents a combination of an outer radius variation and a radial stiffness variation as a function of azimuth α. It is characterized by having a radial stiffness variation as a function of azimuth α dependent on the radial stress the insert undergoes. For that purpose, the two maxima of stiffness K'2(Q) have a radial stiffness dependent on the radial load or stress Q that the insert undergoes.

The insert represented in FIG. 6 is a variant also of the insert represented in FIG. 2. It contains straight walls 51. In the zone of maximum stiffness K'2 the base 10 is radially extended outward by a block of rubber 53. The radial thickness of that block 53 is greater than half the radial height of the walls 51 joining the base 10 to the crown 12. Consequently, the wall 52 joining the block 53 to the crown 12 has a very low radial height and the recesses 54 arranged between the block 53, the crown 12 and the walls 51 and 52 have a volume more than half less than the volume of the recesses 17.

As a result, when a load Q is applied on that zone of maximum stiffness K'2 as a function of azimuth α, wall 52 is crushed with a first given stiffness. Then, when the crown 12 comes in contact with the block 53, the stiffness of the zone K'2 increases very markedly. Consequently, at low loads Q, the amplitude of variation of radial stiffness as a function of azimuth is comparable to that of the insert 40 of FIG. 5; on the other hand, when the load Q exceeds a given threshold, that amplitude of variation increases very markedly. It has been observed that this combination makes it possible to reach an excellent compromise for the effectiveness of excitation produced by the insert. When running over good roads, the slight variation of radial stiffness does not detract from comfort. And, when running over bad roads, the marked variation of radial stiffness makes it possible to maintain good excitation on a run-flat condition.

It is easily possible, without departing from the scope of this invention, to define inserts similar to those just described adapted for concentrating the energies of their warning signals on higher harmonic frequencies.

I claim:

1. A safety insert intended to be mounted in an assembly comprising a tire and a rim of a vehicle and, radially outward from the rim, said insert having a radially outer bearing surface which defines a radial support for the crown of the tire when said tire is deflated and means for generating vibrating warning signals on a run-flat condition, in which said means comprise a variation of a first characteristic M chosen from the group of outer radius and radial stiffness of said insert as a function of azimuth α, which presents at least four maxima distributed in two groups having different values M1 and M2, each group having at least two maxima regularly distributed as a function of azimuth α and offset from each other.

2. A safety insert according to claim 1, in which said characteristic M presents as a function of azimuth α two maxima M1 diametrically opposite and two maxima M2 diametrically opposite and placed at 90° from the maxima M1.

3. A safety insert according to claim 1, in which said characteristic M presents as a function of azimuth α two maxima M1 diametrically opposite and three maxima M2 distributed over the circumference and offset from the maxima M1.

4. A safety insert according to claim 1, in which said characteristic M presents as a function of azimuth α two maxima M1 diametrically opposite and four maxima M2 placed at 90° from one another an offset by 45° from the maxima M1.

5. A safety insert according to claim 1, in which on both sides of each maximum M1 or M2 there is a single value minimum M3.

6. A safety insert according to claim 1, in which said means comprise, in combination with the variation of said first characteristic, a variation as a function of the azimuth of a second characteristic M of the other of the outer radius and radial stiffness of said insert.

7. A safety insert according to claim 6, in which said means comprise a combination of a variation of the outer radius and a variation of the radial stiffness of said insert as a function of azimuth α, so that the insert under load presents a crushed radius as a function of azimuth α containing at least four maxima.

8. A safety insert according to claim 7, in which the variation of radial stiffness as a function of azimuth α depends on the amplitude of the radial stress to which the support is subjected.

9. A safety insert according to claim 8, in which, beyond a given radial stress threshold, the variation of radial stiffness as a function of azimuth α increases very markedly.

10. A safety insert according to claim 1, in which the variation of radial stiffness as a function of azimuth α ranges between 10 and 1000%.

11. A safety insert according to claim 1, in which said first characteristic is the outer radius, and the variation of outer radius as a function of azimuth α ranges between 0.1 and 7 mm.

12. A safety insert according to claim 1, in which the variations of radial stiffness and/or outer radius of the insert are applied axially only on a part of the insert intended to be placed toward the inside of the vehicle.

13. A safety insert according to claim 1, in which the variations of radial stiffness and/or outer radius of the insert present a complementary axial development as a function of azimuth α.

14. A safety insert intended to be mounted in an assembly comprising a tire and a rim of a vehicle and, radially outward from the rim, said insert having a radially outer bearing surface which defines a radial support for the crown of the tire when said tire is deflated and means for generating vibrating warning signals on a run-flat condition, in which said means comprise a variation of a characteristic M chosen from the group of outer radius and radial stiffness of said insert as a function of azimuth α, which presents at least four maxima distributed in at least twice two different values M1 and M2, said insert further comprising a cylindrical base intended to be fitted around the rim, a cylindrical crown intended to come in contact with the tire in case of pressure loss, and walls appreciably connecting the base and the crown radially.

15. A safety insert according to claim 14, in which said insert is made of flexible elastomeric material, with arc-shaped walls.

16. A safety insert according to claim 14, in which said first characteristic is radial stiffness, and the radial variations of stiffness are obtained by varying the thickness of the walls.

17. A safety insert according to claim 14, in which said first characteristic is radial stiffness, and the radial variations of stiffness are obtained by varying the shape of the walls.

18. A safety insert according to claim 14, in which said first characteristic is outer radius, and the variations of outer radius are obtained by varying the length of the walls.

* * * * *

UNITED STATES PATENT AND TRADEMARK OFFICE
CERTIFICATE OF CORRECTION

PATENT NO.     : 6,543,500 B1
DATED          : April 8, 2003
INVENTOR(S)    : Dufournier It is certified that error appears in the above-identified patent and that said Letters Patent is hereby corrected as shown below:

<u>Column 6,</u>
Line 4, "an" should read -- and --

Signed and Sealed this

Twenty-second Day of July, 2003

JAMES E. ROGAN
*Director of the United States Patent and Trademark Office*